June 8, 1937. R. LANDENBERGER 2,083,233
SECURING DEVICE
Filed Sept. 15, 1934
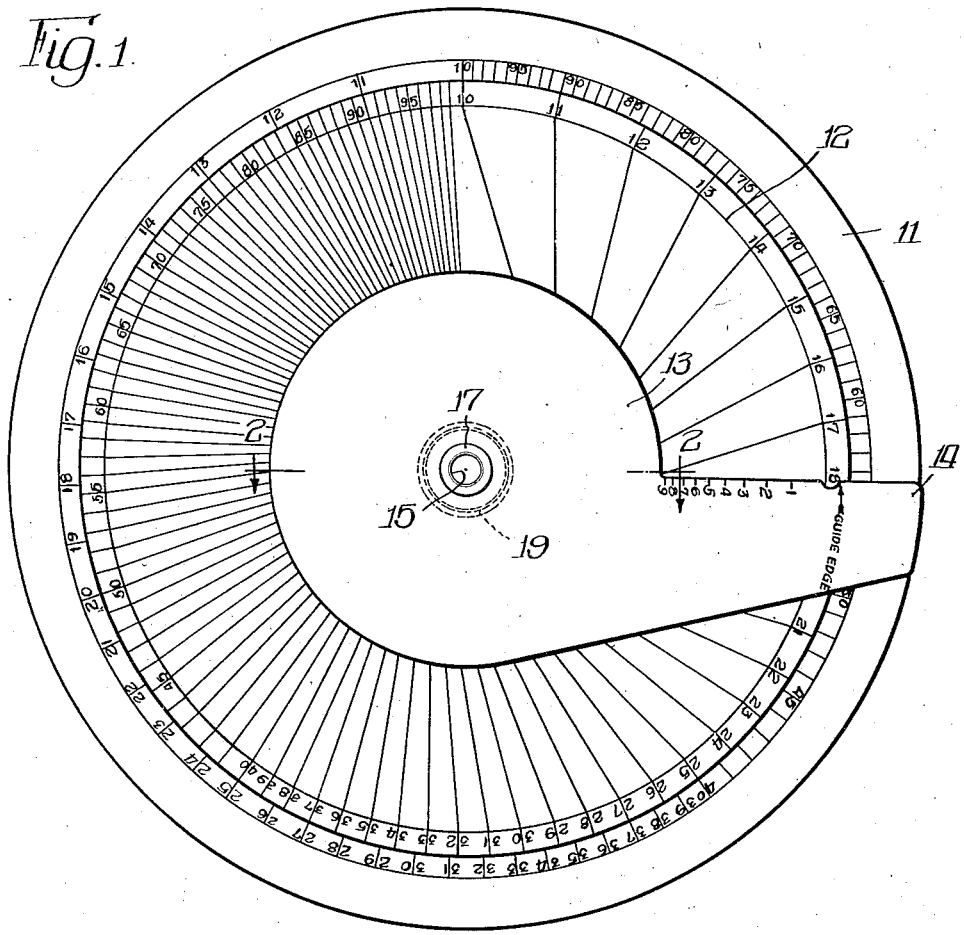
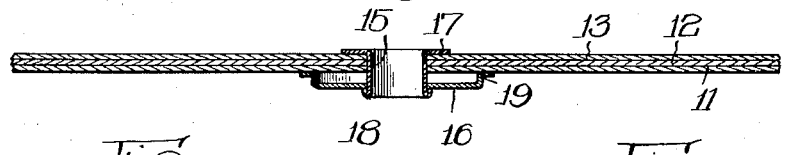
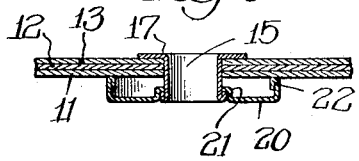
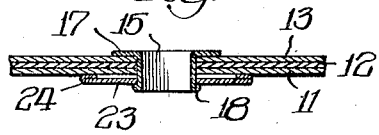
Inventor:
Ralph Landenberger
By Williamson Huxley Byron & Knight
attys.

Patented June 8, 1937

2,083,233

UNITED STATES PATENT OFFICE 2,083,233

SECURING DEVICE

Ralph Landenberger, Evanston, Ill.

Application September 15, 1934, Serial No. 744,146

2 Claims. (Cl. 235—84)

This invention relates to a new and improved securing device, and more particularly to a securing device especially adapted to be used with circular slide rules or similar devices having relatively rotatable parts.

In such circular slide rules or similar computing devices, it is essential that the parts be rotatable relative to each other smoothly and without play, and that wear at the pivot be minimized as much as possible. It is necessary that the parts be gripped with a definite firmness, so as to prevent slippage between the parts when being handled, and yet the parts must be smoothly rotatable relative to each other so that they may be readily adjusted in carrying out computations with the device. It is important that the pivot device have a relatively large bearing against the rotating members so as to reduce wear and play, as even a small amount of play may cause such relative movement between the parts as to render readings of the scale too inaccurate to be of value.

It is an object of the present invention to provide a new and improved securing device and pivot construction for use with circular slide rules or similar devices having relatively rotatable members.

It is a further object to provide a device of this character which will hold the rotatable members firmly together and yet will permit ready adjustment of the members.

It is also an object to provide a device which is simple in design and construction and adapted for commercial production.

Other and further objects will appear as the description proceeds.

I have shown certain preferred forms of my invention in the accompanying drawing, in which—

Figure 1 is a plan view of a calculator embodying my invention;

Figure 2 is a cross-section, on an enlarged scale, taken on line 2—2 of Figure 1; and Figures 3 and 4 are views similar to Figure 2, but showing modified forms of construction.

Referring first to Figures 1 and 2, the device comprises a larger or base disc 11, a smaller or upper disc 12 and a runner disc 13 having a radially extending arm 14. These three members are relatively rotatable and are held together by the pivotal securing device which comprises the sleeve 15 and washer 16. The sleeve 15 has an out-turned flange 17 which engages the upper face of the member 13. The sleeve 15 also has its lower edge out-turned or crimped at 18 to hold the washer 16 in place. The washer 16 has an outer face or edge 19 which is turned in toward the discs and which engages the under face of the disc 11.

The washer 16 is preferably formed of resilient metal such as spring brass or brass coated steel, so that its resilience assists in clamping the discs together. It should also be noted that the contact surface 19 is at a greater distance from the axis of the discs than the outer edge of the flange 17 so that the resilience of the discs assists in the clamping of the discs in a yielding manner. The discs 11, 12, and 13 may be formed of various materials, and preferably, for the reasons stated, of materials having some inherent resilience, such as bristol board, celluloid or light sheet metal.

The particular functioning of the discs forms no part of the present invention, and need not be described in detail. The invention may obviously be applied to similar devices having a plurality of rotatable members regardless of the indicia upon the members or their manner of functioning.

The form of device shown in Figure 3 is similar to that shown in Figures 1 and 2, as far as the discs 11, 12, and 13 and the sleeve 15 and flange 17 are concerned. The washer 20 is recessed as at 21 to receive the crimped edge 18 of the sleeve 15. The inturned edge 22 of washer 20 is bent in upon itself to form a wider and smoother bearing against the disc 11. This facilitates smoothness of action, and reduces wear of the disc in rotating against the edge of the washer.

The form of construction shown in Figure 4 is also similar to Figure 2, insofar as the discs 11, 12, and 13, and sleeve 15 and flange 17 are concerned. The edge 24 of the washer 23 is turned in against the body of the washer to provide a wider bearing face in contact with the disc 11. This contact is spaced outwardly from the flange 15 so as to get the benefit of the resilience in the washer, as well as in the discs, in holding the parts in adjusted relation while permitting them to be readily adjusted.

It is to be understood that the forms of construction shown are illustrative only, and that the invention is capable of further modification and change to meet varying conditions and requirements, and I contemplate such changes and modifications as come within the scope and spirit of the appended claims.

What is claimed is:

1. In combination with a plurality of rotatable perforated resilient discs, a securing device for said discs, said device comprising a sleeve extending through registering perforations in the discs, a flange on one end of the sleeve, a washer carried by the other end of the sleeve and an inturned flange on the washer engaging a disc at points spaced a greater distance from the perforation than the width of the sleeve flange, the sleeve flange and inturned flange being so spaced axially of the sleeve as to maintain the discs in intimate contact at the line of engagement by the inturned flange and to flex said discs jointly whereby the resilience of the discs aids the securing device in maintaining the discs in adjusted rotary position.

2. In combination with a plurality of rotatable perforated resilient discs, a securing device for said discs, said device comprising a sleeve extending through registering perforations in the discs, a flange on one end of the sleeve, a resilient washer carried by the other end of the sleeve and an inturned edge on the washer engaging a disc at points spaced a greater distance from the perforation than the width of the sleeve flange, the sleeve flange and inturned flange being so spaced axially of the sleeve as to maintain the discs in intimate contact at the line of engagement by the inturned flange and to flex said discs jointly whereby the resilience of the discs aids the securing device in maintaining the discs in adjusted rotary position.

RALPH LANDENBERGER.